(12) United States Patent
Kudou et al.

(10) Patent No.: US 7,027,440 B2
(45) Date of Patent: Apr. 11, 2006

(54) ROUTER HAVING A FUNCTION TO PREVENT A PACKET SEQUENCE INVERSION

(75) Inventors: Hideyuki Kudou, Fukuoka (JP); Yushi Murata, Fukuoka (JP); Yasushi Kurokawa, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 921 days.

(21) Appl. No.: 10/105,475

(22) Filed: Mar. 25, 2002

(65) Prior Publication Data

US 2003/0099232 A1    May 29, 2003

(30) Foreign Application Priority Data

Nov. 26, 2001 (JP) .............................. 2001-359078

(51) Int. Cl.
*H04L 12/413* (2006.01)
*H04J 3/04* (2006.01)

(52) U.S. Cl. ...................... 370/389; 370/447; 370/535
(58) Field of Classification Search ........ 370/352–389, 370/347–349, 394–395, 435–474, 503–536
See application file for complete search history.

(56) References Cited

U.S. PATENT DOCUMENTS

| | | | | |
|---|---|---|---|---|
| 5,608,733 A | * | 3/1997 | Vallee et al. ................. | 370/394 |
| 5,617,417 A | * | 4/1997 | Sathe et al. .................. | 370/394 |
| 5,650,993 A | * | 7/1997 | Lakshman et al. ........... | 370/236 |
| 5,875,192 A | * | 2/1999 | Cam et al. ................. | 370/395.7 |
| 5,970,067 A | * | 10/1999 | Sathe et al. .................. | 370/394 |
| 6,504,836 B1 | * | 1/2003 | Li et al. ....................... | 370/349 |
| 6,577,653 B1 | * | 6/2003 | Rochberger et al. ........ | 370/536 |
| 6,625,176 B1 | * | 9/2003 | Amann et al. ............... | 370/503 |
| 6,775,305 B1 | * | 8/2004 | Delvaux ...................... | 370/535 |

FOREIGN PATENT DOCUMENTS

JP    05207041    8/1993

* cited by examiner

*Primary Examiner*—Man U. Phan
(74) *Attorney, Agent, or Firm*—Katten Muchin Rosenman LLP (57) ABSTRACT

A router includes a plurality of control units connected in parallel, each having an input connected to a receiving interface and an output connected to a transmitting interface, and performing timing control of outgoing packets to the transmitting interface based on header information of incoming packets, the incoming packets being stored in a memory and the stored packets being transmitted to the transmitting interface in order of transmission of the outgoing packets. A distributing unit distributes transmitting sequence information, related to the stored packets in the memory, to other control units. The distributing unit determines whether a packet sequence inversion in the control unit occurs, based on a result of comparison of the transmitting sequence information received and the transmitting sequence information held by the control unit, inhibiting the transmission of the stored packets to the transmitting interface when the packet sequence invention is detected.

8 Claims, 12 Drawing Sheets

ROUTER HAVING A FUNCTION TO PREVENT A PACKET SEQUENCE INVERSION

BACKGROUND OF THE INVENTION

1. Field of the Invention

The present invention generally relates to routing equipment, and more particularly to a router that has a function to prevent a packet sequence inversion with the use of a plurality of processing engines connected in parallel.

Generally, the routing equipment is required to perform address/flow determination processing that determines the destination address for the incoming packets and the output port specified for the outgoing packets. Moreover, the routing equipment is required to provide the quality assurance services that guarantee the communication quality factors such as the low delivery delay, the bandwidth requirement, the transmission requirement, the jitter requirement and so on. If the speed of a network becomes high, it is difficult for a single processing unit to process the above-mentioned functions of the destination-address/flow determination and the quality assurance services at high speed. Hence, using a plurality of processing units that are connected in parallel and perform the above functions in a distributed manner is currently demanded.

2. Description of the Related Art

Figure 11:
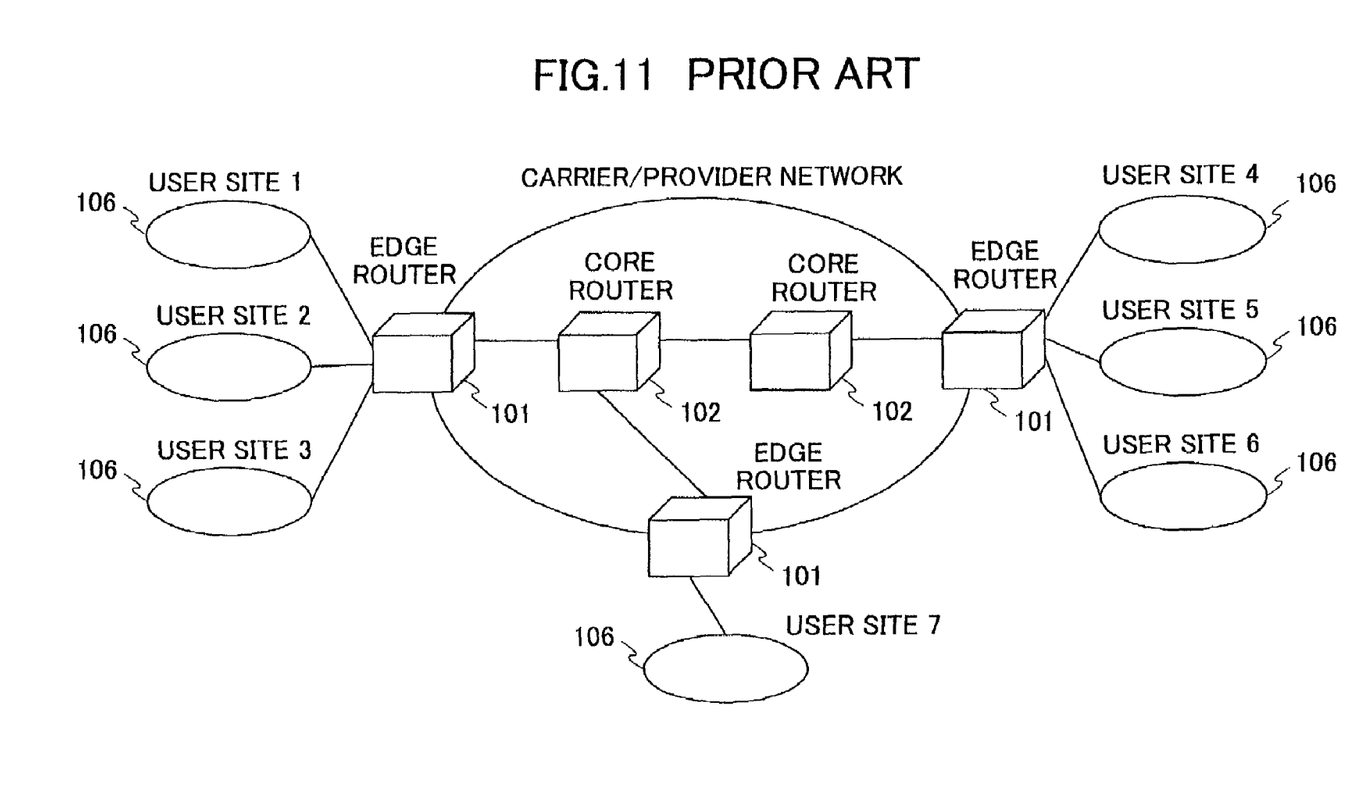
FIG. 11 is a diagram showing a carrier/provider network in which a conventional router is provided.

FIG. 11 shows a carrier/provider network in which a conventional router is provided.

In the network in FIG. 11, edge routers 101, core routers 102, and user sites 106 are provided. In the present case, six user sites or user networks, indicated by "USER SITE1" through "USER SITE6", are provided. The routers, currently used with the career/provider network, are usually equipped with the functions to determine the destination address of packets, which are received from or transmitted to each user network, and provide the quality assurance services for such packets. Thus, for example, the USER SITE1 and the USER SITE6 can exchanges the data that are transmitted over the network.

In recent years, with rapid spreading of the Internet and speed improvement of the network, it is becoming impossible for a single processing unit to perform the functions of the destination-address/flow determination and the quality assurance services for all the packets that are received. Hence, a router using a plurality of processing units that are connected in parallel and perform the above functions in a distributed manner is currently demanded.

Figure 12:
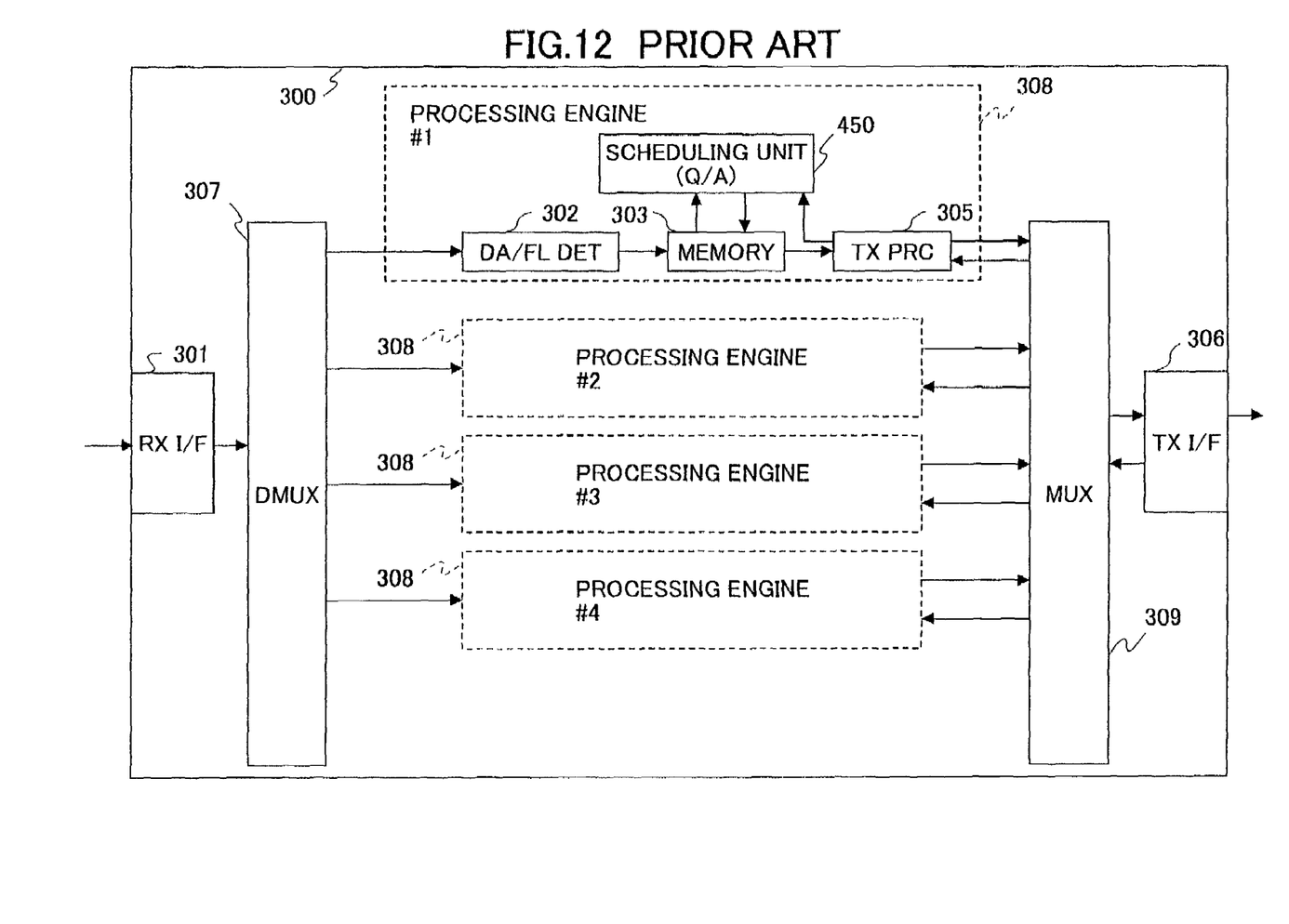
FIG. 12 is a block diagram of a conventional router using a plurality of distributed processing engines.

FIG. 12 shows a conventional router which uses a plurality of distributed processing engines.

As shown in FIG. 12, the conventional router 300 uses a plurality of distributed processing engines 308, in order to perform high-speed processing. In the router 300, the incoming packets are input at a receiving interface (RX I/F) 301. A demultiplexer (DMUX) 307 performs the demultiplexing of the incoming packets to the plurality of processing engines 308, and assigns a sequence number to each packet. Each processing engine 308 performs control of the packets in response to the output of the demultiplexer 307. A multiplexer (MUX) 306 performs the frame assembly and waiting control in response to the outputs of the processing engines 308. A transmitting interface (TX I/F) 306 transmits the outgoing packets to the network in response to the output of the multiplexer 309.

As shown in FIG. 12, the processing engine #1 includes a destination-address/flow determination unit (DA/FL DET) 302, a memory 303, a transmitting processing unit (TX PRC) 305, and a scheduling unit 450. In the processing engine #1, the determination unit 302 determines the destination address and the flow of each packet in response to the output of the demultiplexer 307, and stores the packet into the memory 303. The memory 303 is connected to the scheduling unit 450, and the scheduling unit 304 performs the scheduling (quality assurance) of the stored packets based on the header information of each packet. The transmitting processing unit 305 performs transmitting processing of the frames (or packets). The configuration of other processing engines #2 through #4 is the same as the configuration of the processing engine #1 described above.

The demultiplexer 307 performs the demultiplexing of the incoming packets, received at the receiving interface 301, in accordance with the processing performance of each processing engine 308, and performs the distribution of such packets to the plurality of processing engines 308 for every packet. At this time, the demultiplexer 307 assigns a sequence number each packet.

There are two methods of demultiplexing: (1) one packet is divided into various blocks; and (2) the packets are distributed to one of the processing engines for each packet. The sequence number is assigned to each packet in order of the arrival of the incoming packets, and such packets are sent to the plurality of distributed processing engines 308. In each of the processing engines 308, the destination address determination, the flow determination, and the scheduling are performed for each packet, and, thereafter, the processed packets are sent from the processing engines 308 to the multiplexer 309.

The sent-out packets are multiplexed for each packet by using the multiplexer 309. There are two methods of multiplexing that are respectively in conformity with the two methods of demuliplexing. In the case where one packet is divided into various blocks by the demultiplexer 307, the multiplexer 309 performs the waiting and rearranging of the packet blocks for assembling the frame. In the case where the packets are distributed to the processing engines for each packet, the multiplexer 309 performs the waiting of the packets for outputting the packets in order of the sequence number of each packet. The multiplexed packet from the multiplexer 309 is output to the network through the transmitting interface 306.

In the case of the distributed processing engines, it is necessary to perform the sequence number assignment by the demultiplexer 307 and the waiting of the packets by the multiplexer 309. This is because it is expected in an existing IP (Internet Protocol) network that the incoming packets arrive in order of the sequence number of each packet as in the TCP (Transmission Control Protocol). If a packet sequence inversion occurs with some of the incoming packets, the re-transmission of such packets must be performed. In such a case, the amount of useless traffic will be increased.

It should be noted that the above-mentioned distributed processing system has the following problems.

In the case where one packet is divided into various blocks by the demultiplexer 307, only part of the packet is input to each processing engine, and this is not suitable for a processing engine that needs the complete data of one packet for the processing thereof, and the high-speed processing cannot be realized. Moreover, in the case of a multiplexer which needs the high-speed processing corresponding to a high-speed network, the multiplexer must perform the packet assembly that is time consuming, and it cannot respond to the high-speed network.

Moreover, in the case where the packets are distributed to the processing engines for each packet by the demultiplexer 307, the packets that belong to the same flow (the same destination, or the same protocol) are likely to be distributed to different processing engines. It is difficult to efficiently perform the distributed processing of the packets in such a case.

As described above, it is expected in the existing IP network that the incoming packets arrive in order of the sequence number of each packet as in the TCP. If a packet sequence inversion occurs with some of the incoming packets, the re-transmission of such packets must be performed, which will cause the amount of useless traffic to be increased. It is difficult for the conventional router to suitably respond to the above packet sequence inversion.

Moreover, even if the multiplexer on the output side of the router rearranges the outgoing packets in a proper sequence according to the sequence number of each packet, it is difficult to speedily perform the rearrangement of the packets so as to suit the requirements of a high-speed network.

SUMMARY OF THE INVENTION

An object of the present invention is to provide an improved router in which the above-described problems are eliminated.

Another object of the present invention is to provide a router that efficiently carries out the function to prevent the packet sequence inversion with the use of a plurality of processing engines which perform high-speed processing.

The above-mentioned objects of the present invention are achieved by a router including a plurality of control units connected in parallel, each control unit having an input connected to a receiving interface and an output connected to a transmitting interface, and performing timing control of outgoing packets to the transmitting interface based on header information of incoming packets from the receiving interface, the incoming packets being stored in a memory and the stored packets being transmitted to the transmitting interface in order of transmission of the outgoing packets based on a result of the timing control, each control unit comprising: a distributing unit which is provided in the control unit and distributes transmitting sequence information, related to the stored packets in the memory of the control unit, to other control units, the distributing unit determining whether a packet sequence inversion in the control unit occurs, based on a result of comparison of the transmitting sequence information received from the other control units and the transmitting sequence information held by the control unit, and the distributing unit inhibiting the transmission of the stored packets to the transmitting interface when the packet sequence invention is detected.

According to the router of the present invention, the packet sequence inversion that may take place in any of the plurality of processing engines can efficiently be prevented it based on the transmitting sequence information, including the sequence number, that is exchanged between the scheduling units by using the ring or mesh wiring. It is possible for the present invention to perform high-speed distributed processing for preventing the packet sequence inversion. The router of the present invention is effective in performing high-speed processing of the packet sequence inversion prevention with the use of the plurality of processing engines which perform the destination-address/flow determination and the quality assurance services.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be given of preferred embodiments of the present invention with reference to the accompanying drawings.

Figure 1:
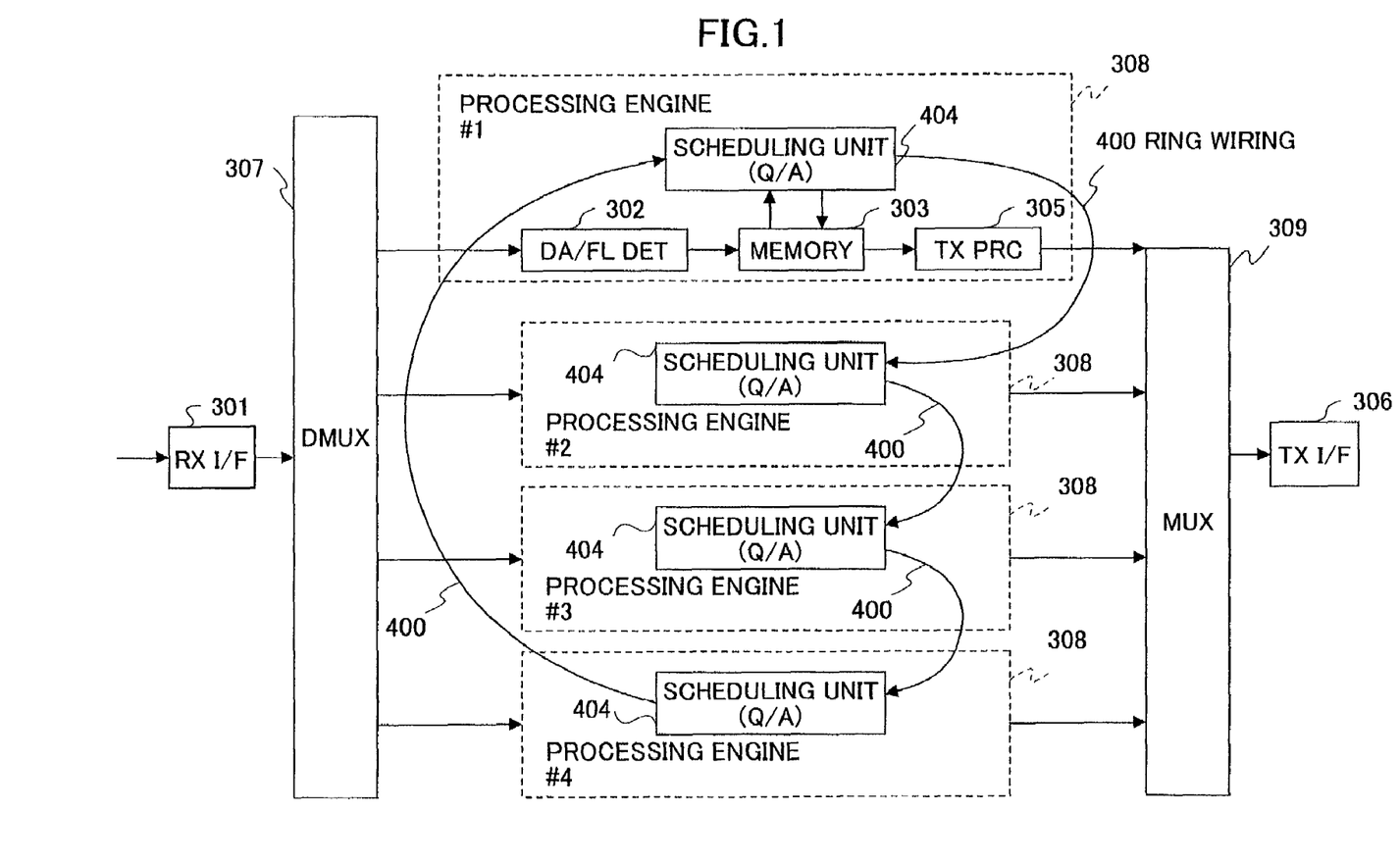
FIG. 1 is a diagram showing a basic configuration of the router according to the present invention.

FIG. 1 shows a basic configuration of the router according to the present invention.

In FIG. 1, the elements that are essentially the same as corresponding elements in FIG. 12 are designated by the same reference numerals, and a description thereof will be omitted.

In the router shown in FIG. 1, the receiving interface 301 receives the incoming packets. The demultiplexer (DMUX) 307 performs the demultiplexing of the incoming packets and distributes them to one of the processing engines 308 for each packet, in response to the output of the receiving interface 301. Each of the processing engines 308 receives the packet from the demultiplexer 307. Each processing engine 308 is a control unit that performs timing control of the outgoing packets.

In the present embodiment of FIG. 1, the case where four processing engines #1 through #4 are connected in parallel. However, the router of the present invention is not limited to this embodiment. Alternatively, an arbitrary number of processing engines connected in parallel may be provided in the router of the present invention.

The multiplexer (MUX) 309 performs the multiplexing of the processed packets, sent from the processing engines 308, in order of the output of outgoing packets in response to the outputs from the processing engines 308. The transmitting interface 306 transmits the outgoing packets to a subsequent node of the network in response to the output of the multiplexer 309. The transmitting interface 306 has a plurality of output ports (not shown in FIG. 1). One of the plurality of output ports in the transmitting interface 306 is selected for transmitting the outgoing packets to the destination station in the network, based on the header information of each packet.

In the present embodiment, a ring wiring 400 connects the plurality of scheduling units 404 in a ring-like formation. In each of the processing engines 308, the destination-address/flow determination unit (DA/FL DET) 302 determines the destination address and the flow number of each packet based on the header information of the packet in response to the output of the demultiplexer 307. The determination of the destination address is performed to determine which destination station in the network the outgoing packet is transmitted to. The determination of the flow number is performed to determine which output port of the transmitting interface 306 the outgoing packet is sent to. The determination unit 302 stores the packet into the memory 303. The memory 303 is connected to the scheduling unit 404.

Moreover, in each of the processing engines 308, the scheduling unit 404 performs scheduling of the stored packets for ensuring quality assurance (Q/A) based on the header information of each packet. The transmitting processing unit (TX PRC) 305 performs the transmitting processing of the frames (or packets).

In the router of the present invention, transmitting sequence information of the stored packets is exchanged between the scheduling units 404 using the ring wiring 400 which connects the scheduling units 404 of the processing engines 308 in the ring formation. That is, the packet sequence inversion, as in the conventional router, can be prevented by communicating the transmitting sequence information with each of the scheduling units 404, the transmitting sequence information being generated the sequence number added at the time of reception. Here, the flow number is a control information that identifies the flow to which the packet belongs.

More specifically, in the router of FIG. 1, the receiving interface 301 receives the incoming packets, and assigns a sequence number to each incoming packet at the time of the frame conversion, for the purpose of detecting a packet sequence inversion. The sequence number assignment is performed as an example of the transmitting sequence information of the packet. The packet to which the sequence number is assigned is sent to the demultiplexer 307. The demultiplexer 307 distributes the incoming packets to the processing engines 308 for each packet. After the destination address determination and the quality assurance processing are performed, the processing engines 308 send the processed packets to the transmitting interface 306. That is, the receiving interface 301 and the demultiplexer 307 are provided as a distribution means.

The order of the outputting of the outgoing packets is determined by the scheduling units 404, and the ring wiring 400 which connects the scheduling units 404 in the ring formation is used, and the packet sequence inversion is checked based on the sequence number added at the time of the distribution of the incoming packets.

In the present embodiment, the sequence number checking for preventing the packet sequence inversion is performed by the scheduling units 404, while the scheduling units 404 perform the high-speed distributed processing. The speed of the sequence number checking using the ring wiring 400 becomes 1/n (n is the number of distributed processing) of the circuit speed. Therefore, the multiplexer 309 is only required to output the outgoing packets the transmitting interface 306 in order of the arrival of each packet, and the other portion of the router for which the high-speed processing is needed can respond to a high-speed network.

Figure 2:
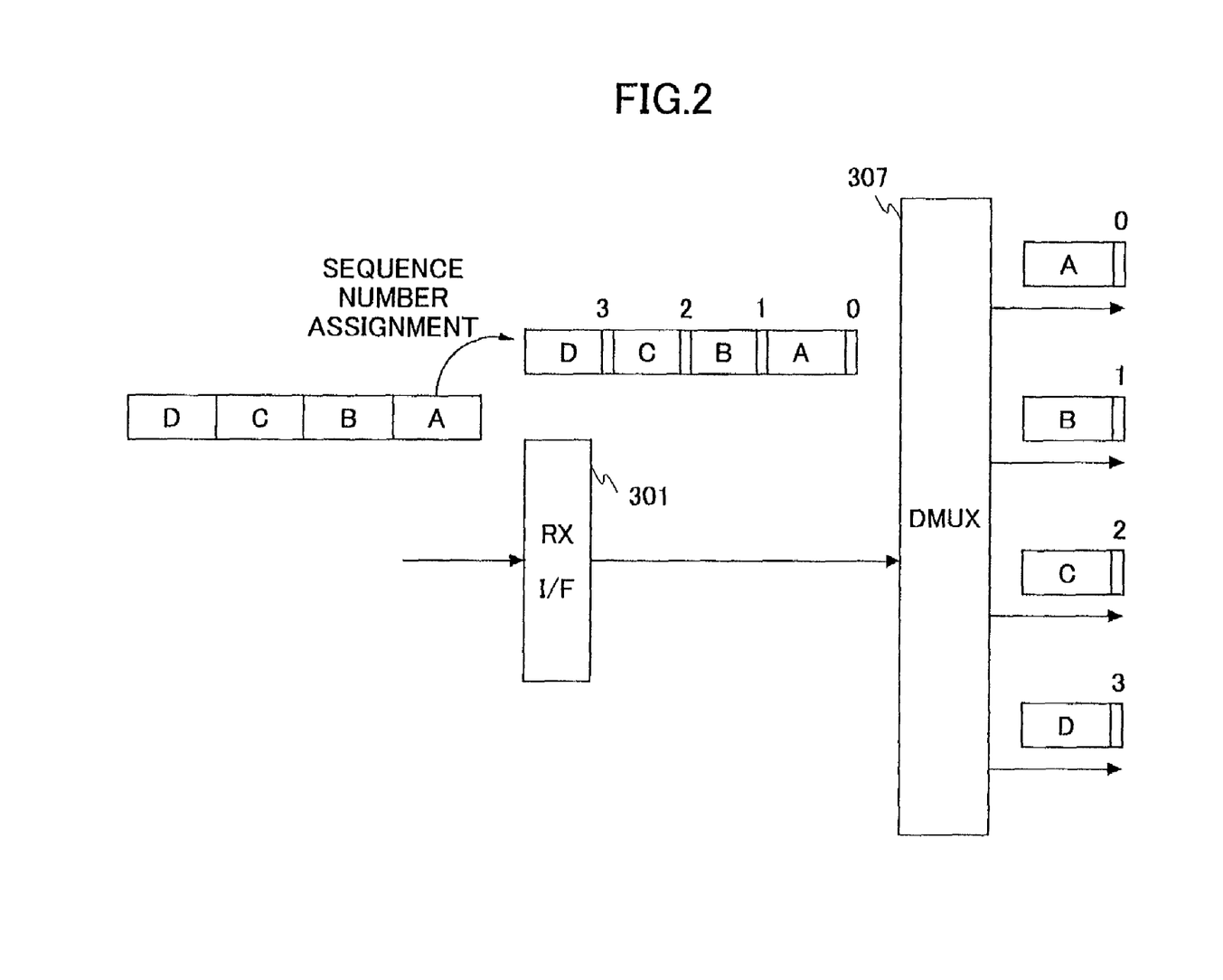
FIG. 2 is a diagram for explaining sequence number assignment that is used by the router of the present invention.

FIG. 2 shows a sequence number assignment that is used by the router of the present invention.

As shown in FIG. 2, the incoming packets are inputted to the receiving interface 301 in order of A, B, C, and D. The receiving interface 301 gives the sequence number of 0, 1, 2, and 3 in order of the input to each packet. Therefore, it is possible to efficiently detect the sequence of the incoming packets, arriving at the router, by checking the sequence number of each packet. In the case of the example of FIG. 2, the demultiplexer 307 has inputted into each processing engine the packet inputted in order of the arrival.

The ring wiring 400 connects the plurality of processing engines 308 in the ring formation. The transmitting sequence information of the packets is exchanged between the processing engines 308 by using the ring wiring 400. Thus, according to the router of the present invention, the packet sequence inversion can be prevented based on the sequence number added at the time of the reception.

Moreover, the router of the present invention is equipped with a plurality of processing engines 308. The plurality of processing engines perform in parallel the packet sequence inversion checking, respectively. Hence, according to the present invention, it is possible to perform at high speed the processing for preventing the packet sequence inversion.

Moreover, in the router of the present invention, the scheduling unit which performs the quality assurance processing of the network can perform the packet sequence inversion checking in order to prevent the packet sequence inversion. The router of the present invention is effective in performing high-speed processing of the destination-address/flow determination and the quality assurance services with the use of the plurality of processing engines.

Figure 3:
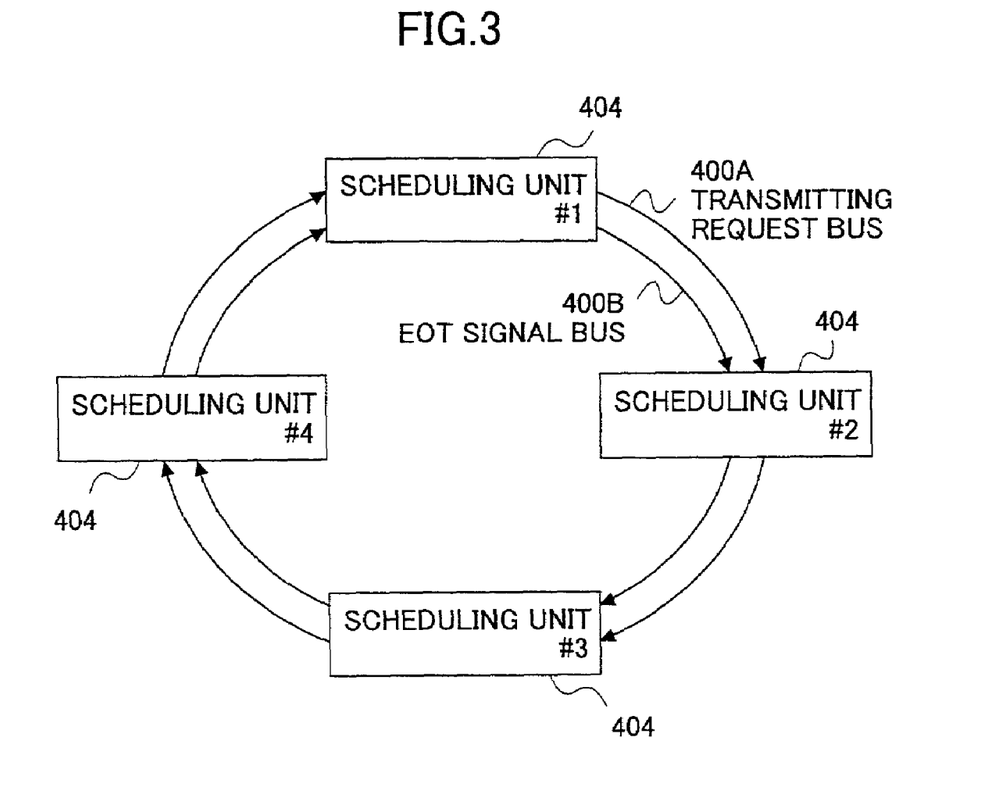
FIG. 3 is a diagram showing a ring-wiring configuration of a plurality of scheduling units that is used by the router of the present invention.

FIG. 3 shows a ring configuration of a plurality of scheduling units that is used by the router of the present invention.

As shown in FIG. 3, the four scheduling units 404 (SCHEDULING UNITS #1 through #4) are provided, and the scheduling units 404 are connected together in a ring formation by the ring wiring 400. In the ring wiring 400, a transmitting request bus 400A is provided in order to check a packet sequence inversion before transmission of the outgoing packets, while an end-of-transmission (EOT) signal bus 400B is provided in order to notify an adjacent scheduling unit of the completion of transmission of the outgoing packets after the transmission thereof. The ring wiring 400 is delivering the transmitting request signal and the EOT signal in order of SCHEDULING UNITS #1, #2, #3 and #4.

Figure 4:
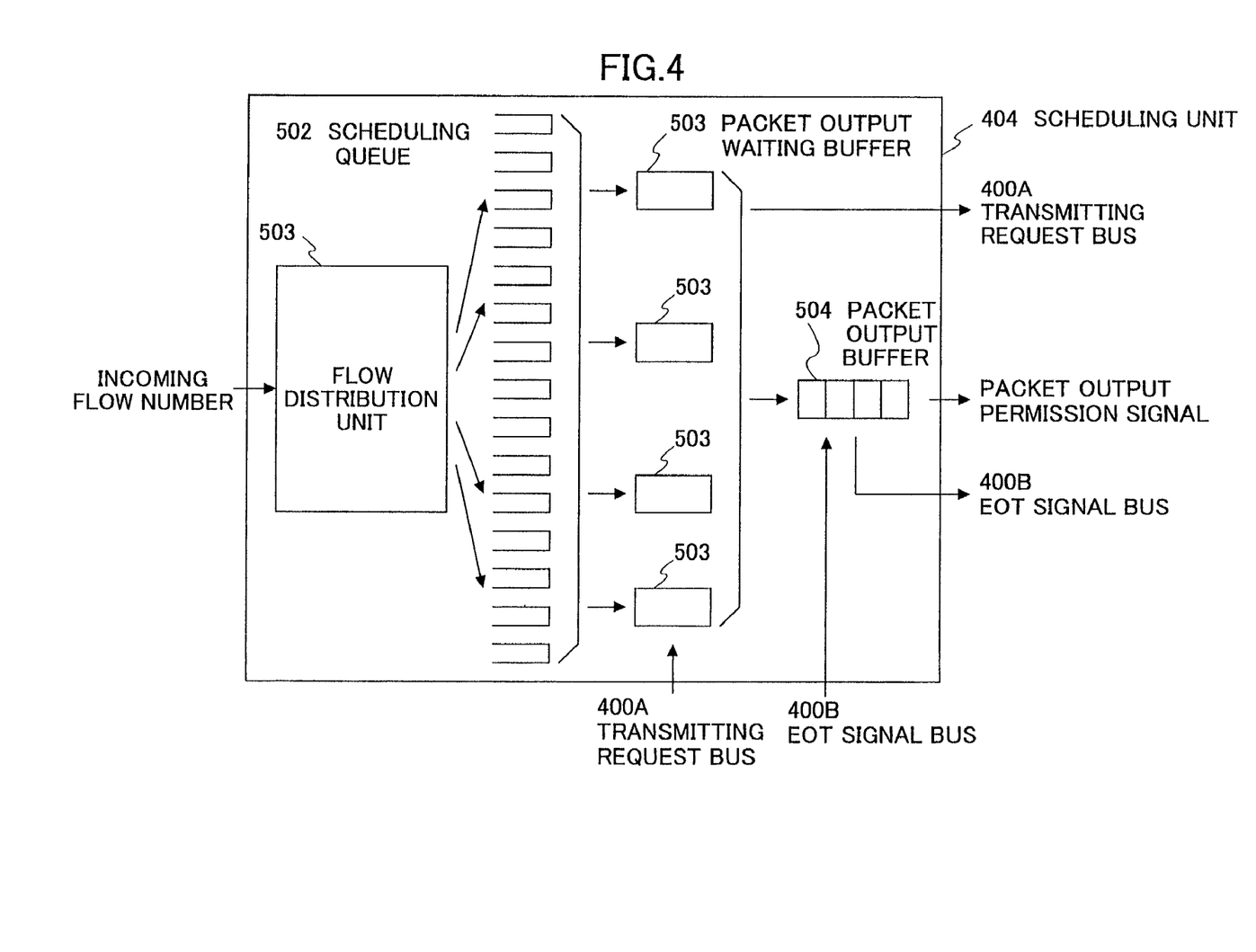
FIG. 4 is a diagram for explaining operation of one of the plurality of scheduling units according to the present invention.

FIG. 4 shows operation of the scheduling unit 404 according to the present invention.

As shown in FIG. 4, the flow distribution unit 501 inputs an incoming flow number and sends it to one of the scheduling queues 502. Each of the scheduling queues 502 stores the flow number according to the distribution of the flow distribution unit 501. The packet output waiting buffer 503 stores the header information of the packet from each scheduling queue 502. The packet output buffer 504 stores the output from the packet output waiting buffer 503. The transmitting request bus 400A is connected to an input of the packet output waiting buffer 503. The end-of-transmission signal bus 400B is connected to an input of the packet output buffer 504. Moreover, the transmitting request bus 400A is taken out from an output of the waiting buffer 503, and the end-of-transmission signal bus 400B is taken out from an output of the packet output buffer 504. Furthermore, a packet output permission signal is sent out from the output of the packet output buffer 504.

A description will be given of the operation of the thus configured scheduling unit 404 according to the present invention. Based on the header information (the sequence number, the packet identifier, and the flow number) of the stored packet received from the memory 303 (see FIG. 1), the flow distribution unit 501 performs the distribution of the header information of the received packet. The flow distribution unit 501 performs queuing of each header information to the scheduling queue 502. The scheduling queue 502 performs scheduling of each header information for each flow number. In this case, the data (or text information) of the received packet is stored in the memory 303 only, and is not supplied to the scheduling unit 404.

The scheduling unit 404 performs scheduling of the header information of the received packet by which the queuing is performed. Consequently, the scheduling unit 404 determines the transmitting sequence of the stored packets. The header information of each packet with the transmitting sequence is determined is stored into the waiting buffer 503 as a result of the scheduling. The scheduling unit 404 outputs the header information (the flow number and the sequence number) of the stored packet to the transmitting request bus 400A as the packet output permission signal.

For example, the packet output permission signal (the flow number and the sequence number) of the stored packet, which is permitted to be output from the scheduling unit #1, is sent to the scheduling unit #2. The scheduling unit #2 compares the sequence number of the packet, queued to the waiting buffer 503 of the unit #2 and having the same flow number, with the sequence number of the stored packet which is received from the scheduling unit #1. When the sequence number of the packet, queued to the waiting buffer 503 of the unit #2 and having the same flow number, is smaller than the sequence number of the stored packet received from the scheduling unit #1, it is determined that a packet sequence inversion occurs in the scheduling unit #2. Namely, since the packet with a small sequence number is located in the processing engine #2 which is a subsequent node of the processing engine #1 sending out the packet of a large sequence number to the processing engine #2, it is determined that a packet sequence inversion has occurred.

When it is determined that the packet sequence inversion has occurred, the scheduling unit #2 adds a signal having the value indicating rejection (NG) to the transmitting request information, and sends the transmitting request information with the added signal to the following scheduling unit #3. Otherwise the scheduling unit #2 adds a signal the value having the value indicating acceptance (OK) to the transmitting request information, and sends the transmitting request information with the added signal to the following scheduling unit #3. The transmitting request information is sent to the scheduling unit #3 through the transmitting request bus 400A from the scheduling unit #2. Similarly, the scheduling unit #3 and #4 compare the sequence numbers, and send the transmitting request information with the added signal. Hence, once the transmitting request information is sent from the scheduling unit #1, the transmitting request information sent out from the scheduling unit #4 is returned back to the scheduling unit #1 through the ring wiring 400.

When all of the determination results (the results of the units #2, #3, and #4) of the transmitting request information received at the scheduling unit #1 are acceptance (OK), the scheduling unit #1 outputs the header information of the packets, queued to the waiting buffers 503, to the packet output buffer 504. The scheduling unit #1 sends out the output permission signal of the stored packets to the memory 303. Consequently, the stored packets are outputted from the memory 303 to the transmitting processing unit 305. That is, the packet data read from the memory 303 is transmitted to the multiplexer 309 through the transmitting processing unit 305, and after being multiplexed, it is outputted to a subsequent node in the network from the transmitting interface 306.

On the other hand, when at least one of the determination results (the results of the units #2, #3, and #4) of the transmitting request information received at the scheduling unit #1 is rejection (NG), the scheduling unit #1 is set in a waiting state, holding the header information of the packets in the waiting buffers 503. In this case, it is determined that the packet sequence inversion has occurred in any of the processing engines 308, the scheduling unit #1 inhibits the transmission of the stored packets. The header information of the stored packets in the waiting buffers 503 is retained. When there are the packets in the waiting buffers 503 waiting for the output, the scheduling unit #1 receives the end-of-transmission signal from the EOT signal bus 400B from the adjacent scheduling unit. Based on the information on the end-of-transmission signal received, the scheduling unit #1 recognizes the flow number of the packets transmitted from the processing engine having the adjacent scheduling unit. When there is a packet having the same flow number as the flow number of the stored packets in the waiting buffers 503 of the scheduling unit #1, the scheduling unit #1 transmits again the transmitting request to the transmitting request bus 400A to the adjacent scheduling unit. Consequently, the scheduling unit #1 checks the packet sequence inversion again in the above-described manner, and, finally it outputs the packet output permission signal.

Figure 5:
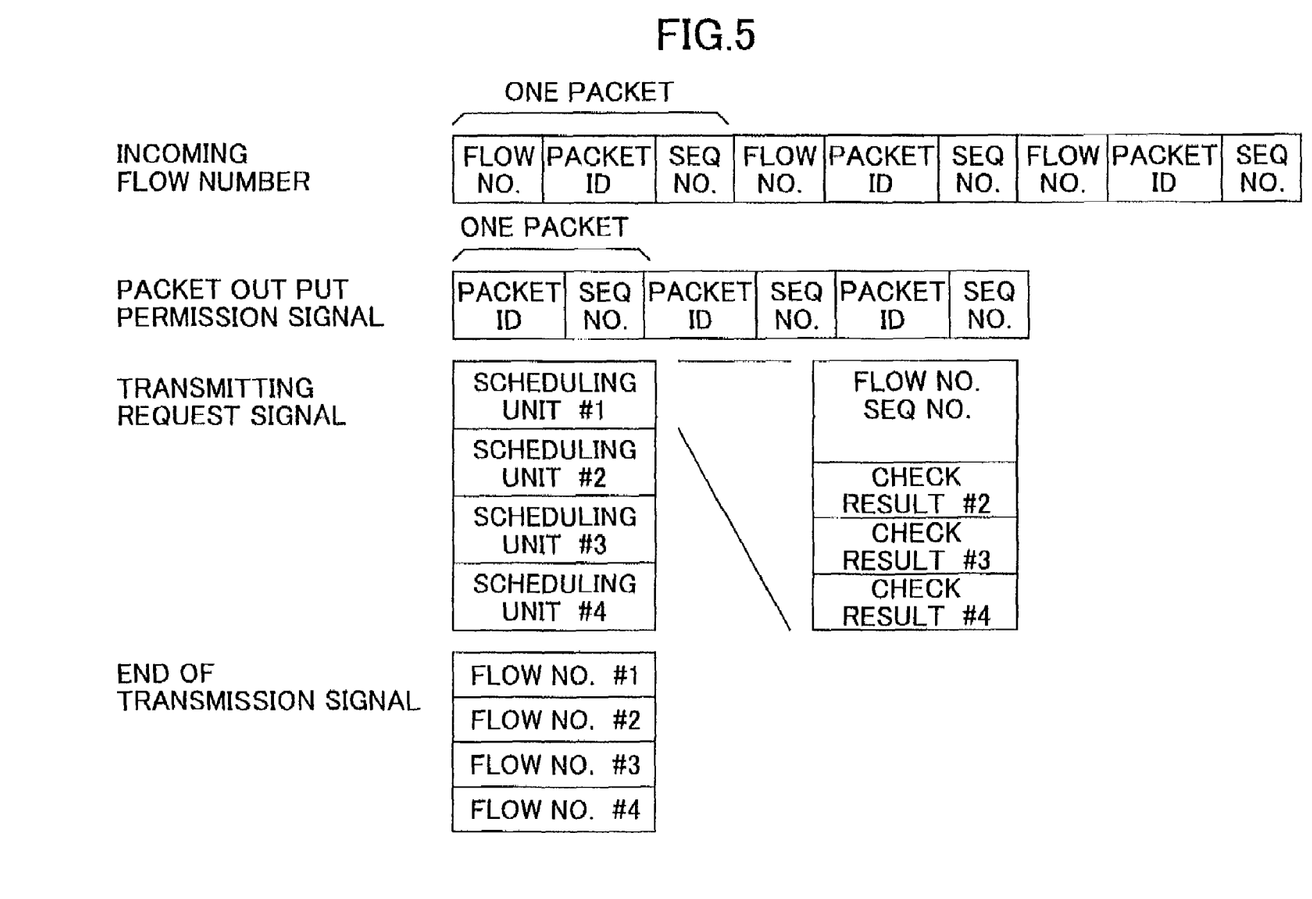
FIG. 5 is a diagram for explaining the format of each of signals that are exchanged between the scheduling units according to the present invention.

FIG. 5 shows the format of each of various signals that are exchanged between the scheduling units according to the present invention.

As shown in FIG. 5, the incoming flow number signal includes the sequence number which is assigned when the packet is received, the packet identifier that identifies the packet to be stored in the memory 303, and the flow number that is needed to perform the quality control of the packet.

The packet output permission signal includes the sequence number and the packet identifier that identifies the packet stored in the memory 303. Since the flow number is unnecessary, it is not contained in the packet output permission signal. If this packet output permission signal is received, the processing engine 308 reads the corresponding packet from the memory 303 based on the packet identifier, and sends the read packet to the multiplexer 309 through the transmitting processing unit 305.

Concerning the transmitting request signal, the bandwidth assignment as per each scheduling unit 404 is performed to the transmitting request bus 400A. As shown in FIG. 5, the transmitting request information includes the flow number that is used to check the packet sequence inversion, and the determination results of the other scheduling units.

The end-of-transmission (EOT) signal includes the flow numbers concerning the packets of the respective scheduling units (#1, #2, #3, #4) that output the packet output permission signal. The adjacent scheduling unit which receives the flow number will transmit a transmitting request again, if the flow number and the packet sequence inversion checking are in the waiting state. Thus, the transmission of the stores in the waiting state is urged by the EOT signal.

In addition, the destination-address/flow determination unit 302 is made to correspond to the packets, and causes the memory 303 to store the output port number that is determined by the destination address determination. The transmitting processing unit 305 outputs the output port number to the multiplexer 309 in accordance with the packet concerned. Based on the received output port number, the transmitting interface unit 306 chooses the output port of the stored packets from the plurality of output ports.

Figure 6:
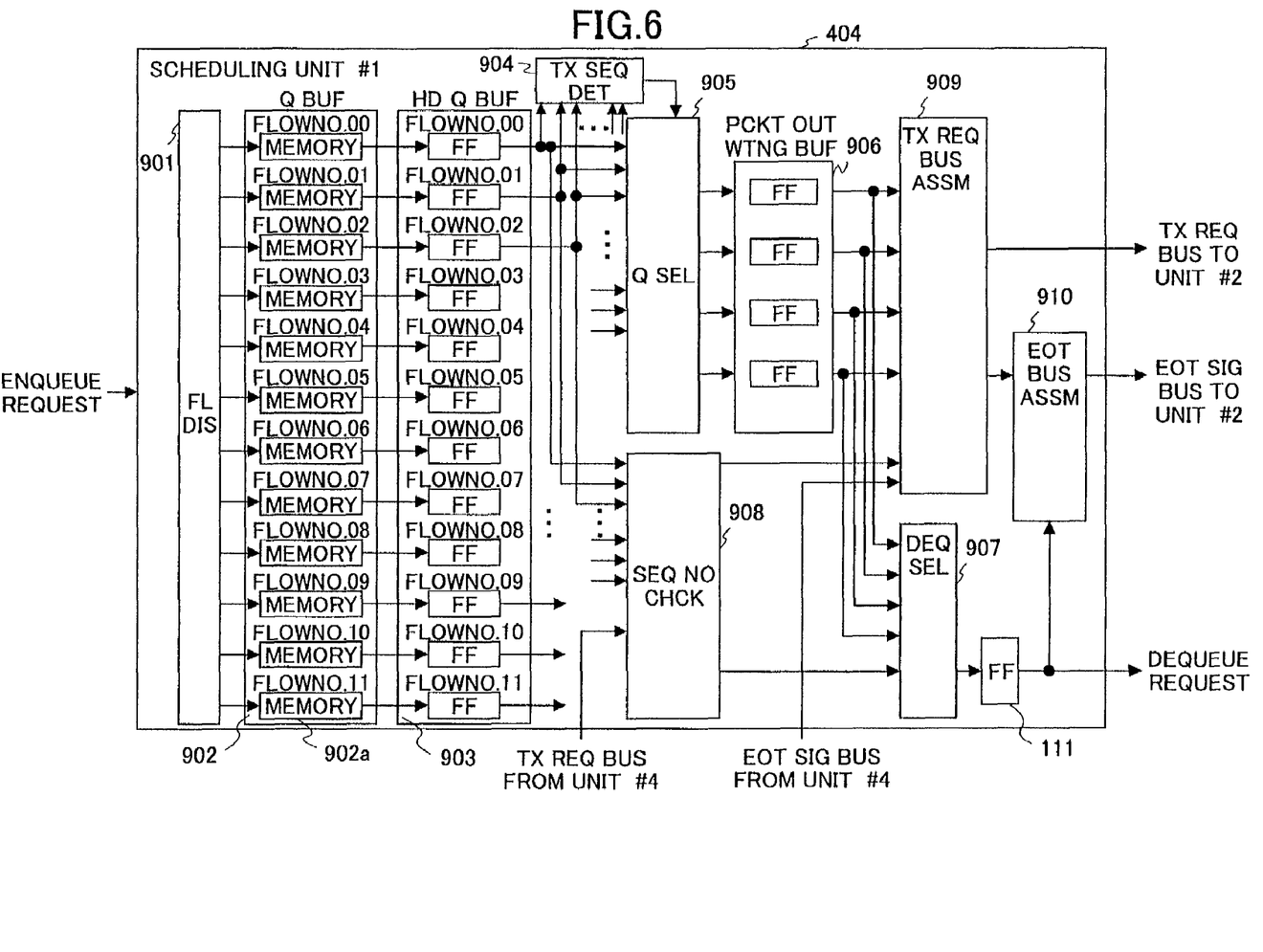
FIG. 6 is a block diagram of one embodiment of the scheduling unit in the router of the present invention.

FIG. 6 shows one embodiment of the scheduling unit 404 in the router of the present invention.

As shown in FIG. 6, the memory 303 (FIG. 1) receives the packet, and the flow distribution unit 901 outputs the sequence number of the packet, the packet identifier, and the flow number to the scheduling unit 404. The flow distribution unit 901 distributes the header information of the received packet for each flow number, if the enqueue request is received. The header information which can be distributed is stored in the queue buffer 902 (the memory 902a) until the flow number becomes the head or top of the queue. In order that the head queue buffer 903 may show the header information of the top to the transmitting sequence determination unit 904 among the header information on each queue, it reads the header information on each queue from the memory 902a, and holds it.

The transmitting sequence determination unit 904 performs scheduling which determines from which queue header information is read to the next from the header information on the head of each queue. The queue selection unit 905 chooses the header information on the head queue buffer 903 based on the result of the scheduling of the transmitting sequence determination unit 904. The waiting buffer 906 for a packet output holds the header information chosen in the queue selection unit 905 until it will actually be in the output state of a packet. The dequeue selection unit 907 performs output request of a packet to the memory 303 holding the data of a packet about the packet used as output permission.

The sequence number check unit 908 compares the scheduling result on transmitting request bus 400A which received with the information on the head queue buffer 903, and checks a sequence number. The transmitting request bus assembly unit 909 generates transmitting request information based on the state of the waiting buffer 906 for a packet output, and the check result of the sequence number check unit 908. The notice bus assembly unit 910 of the completion of transmitting generates the notice information of the completion of transmitting from dequeue request from the dequeue selection unit 907.

A flip flop (FF) 111 latches the output of the dequeue selection unit 907. The output of the flip prop 111 is inputted into the notice bus assembly unit 110 of the completion of transmitting while it is outputted outside as a dequeue request signal. Transmitting request bus 400A linked to scheduling unit #2 is connected to the output of the transmitting request bus assembly unit 909, and notice bus of the completion of transmitting 400B is connected to the output of the notice bus assembly unit 910 of the completion of transmitting. Moreover, transmitting request bus 400A linked to scheduling unit #4 is connected to the input of the sequence number check unit 908, and notice bus of the completion of transmitting 400B is connected to the input of the transmitting request bus assembly unit 909.

In order to guarantee the quality of the packet, the packet to which it was inputted into router equipment and the sequence number was added in order of the input is once saved to a memory 303, and will be in the state waiting for an output from the scheduling unit 404. If a packet is written in a memory 303, in order to perform scheduling request of the packet, enqueue request are outputted from a memory 303 to the scheduling unit 404. In the scheduling unit 404 which received enqueue request, in the flow distribution unit 901 in the scheduling unit 404, the flow number of the received enqueue request is detected and it outputs to the queue buffer 902 corresponding to this flow number.

The internal memory 902a stores the corresponding enqueue data of a flow number in the queue buffer 902. The writing and read-out to memory 902a perform writing from the data received previously, and read-out is read from the data written in previously. As the queue buffer 902 serves as FIFO composition in the flow number, it does not change by the same flow number.

The data for which it came to the head of each queue once writes in to the head queue buffer 903, and it is made for the information on the head of each queue to be in sight from the transmitting sequence determination unit 904 in the queue buffer 902, so that scheduling may be made in the transmitting sequence determination unit 904. In the transmitting sequence determination unit 904, scheduling is performed based on the packet information on each flow, and a packet is outputted from which queue, or it determines.

The result of the scheduling of the transmitting sequence determination unit 904 is outputted to the queue selection unit 905, and chooses the data of the head queue buffer 903, and the selected header information is once written in the waiting buffer 906 for a packet output, in order to check the packet sequence inversion. After selection of the data which is outputted to the dequeue selection unit 907 and serves as waiting for an output by the waiting buffer 906 if it is determined as a result of the checking that the sequence inversion of the packet has not occurred with other scheduling units 404 in which the header information written in the waiting buffer 906 is performing distributed processing is performed, the dequeue request is outputted to the memory 303.

The sequence number check unit 908 compares the sequence number of a packet which was received from transmitting request bus 400A and which serves as waiting for an output in other scheduling units 404 with the received flow number which is held by the own head queue buffer 903 and the sequence number of the same flow number. The method of comparing is as follows.

That is, size comparison with the flow number and sequence number which were received, and the sequence number of the corresponding flow number currently held by the head queue buffer 903 is performed, and when the sequence number currently held by the own head queue buffer 903 is larger than the sequence number of the flow number received from other scheduling units 404, a check result is set to O.K., and a check result will be set to NG if the own sequence number is smaller.

This check result is transmitted to the transmitting request bus assembly unit 909 for generation of transmitting request bus 400A. Moreover, in this sequence number check unit 908, the sequence number check result in other scheduling units 404 of the data which serves as waiting for an output by the waiting buffer 906 for an output which receives from transmitting request bus 400A is separated, and the sequence number check result of other scheduling units is outputted to the dequeue selection unit 907. In the dequeue selection unit 907, if the check result which dissociated and was received is O.K., it will output to a memory 303 by considering the corresponding data of a flow number as dequeue request.

In the transmitting request bus assembly unit 909, the check result of the sequence number check unit 908 is received, multiplexing of the flow number and the check result of the packet which newly becomes the waiting for output by the waiting buffer 906 is carried out, and it sends out as transmitting request bus 400A. Moreover, in this scheduling unit, other scheduling units which receive via the EOT signal bus 400B check the flow number which performs dequeuing, and send out again the dequeue request of the same flow number used as the waiting for a packet output to the transmitting request bus 400A.

In the bus assembly unit 910, in order to tell the flow number of the packet which performs the dequeue request to other scheduling units which are performing distributed processing, the multiplexing is carried out to the end-of-transmission signal received from other scheduling units, and it sends out the EOT signal to the bus 400B.

As mentioned above, according to the present embodiment, the packet sequence inversion is prevented by checking the sequence number of the packet which wants to dequeue the scheduling units which process dispersedly based on the sequence number added at the time of the input of a packet through the transmitting request bus 400A and the EOT signal bus 400B.

Figure 7:
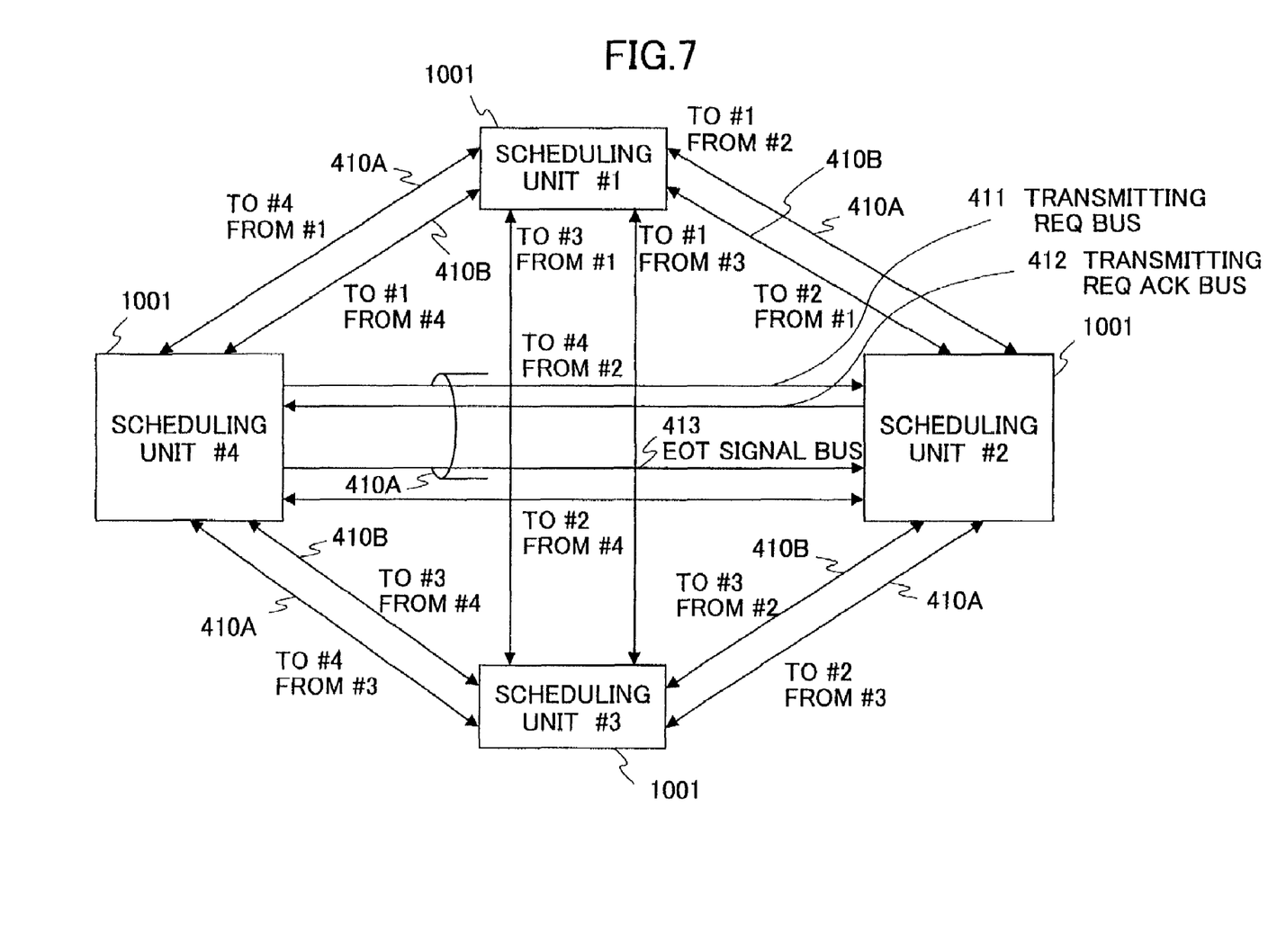
FIG. 7 is a diagram showing a mesh-wiring configuration of the plurality of scheduling units that is used by the router of the present invention.

FIG. 7 shows a mesh configuration of the plurality of scheduling units that is used by the router of the present invention.

In the present embodiment, the scheduling units 1001 are connected together in a mesh configuration, which is different from that of the previous embodiment of FIG. 1. As shown in FIG. 7, each of the scheduling units 1001 performs the distributed processing by one to one through the transmitting request bus, the transmitting request reply bus, and the end-of-transmission signal bus. The interconnection between the scheduling units 1001 is performed by the buses 410A and 410B. Each of the buses 410A and 410B includes a transmitting request bus 411, a transmitting request reply bus 412, and an EOT signal bus 413.

Figure 8:
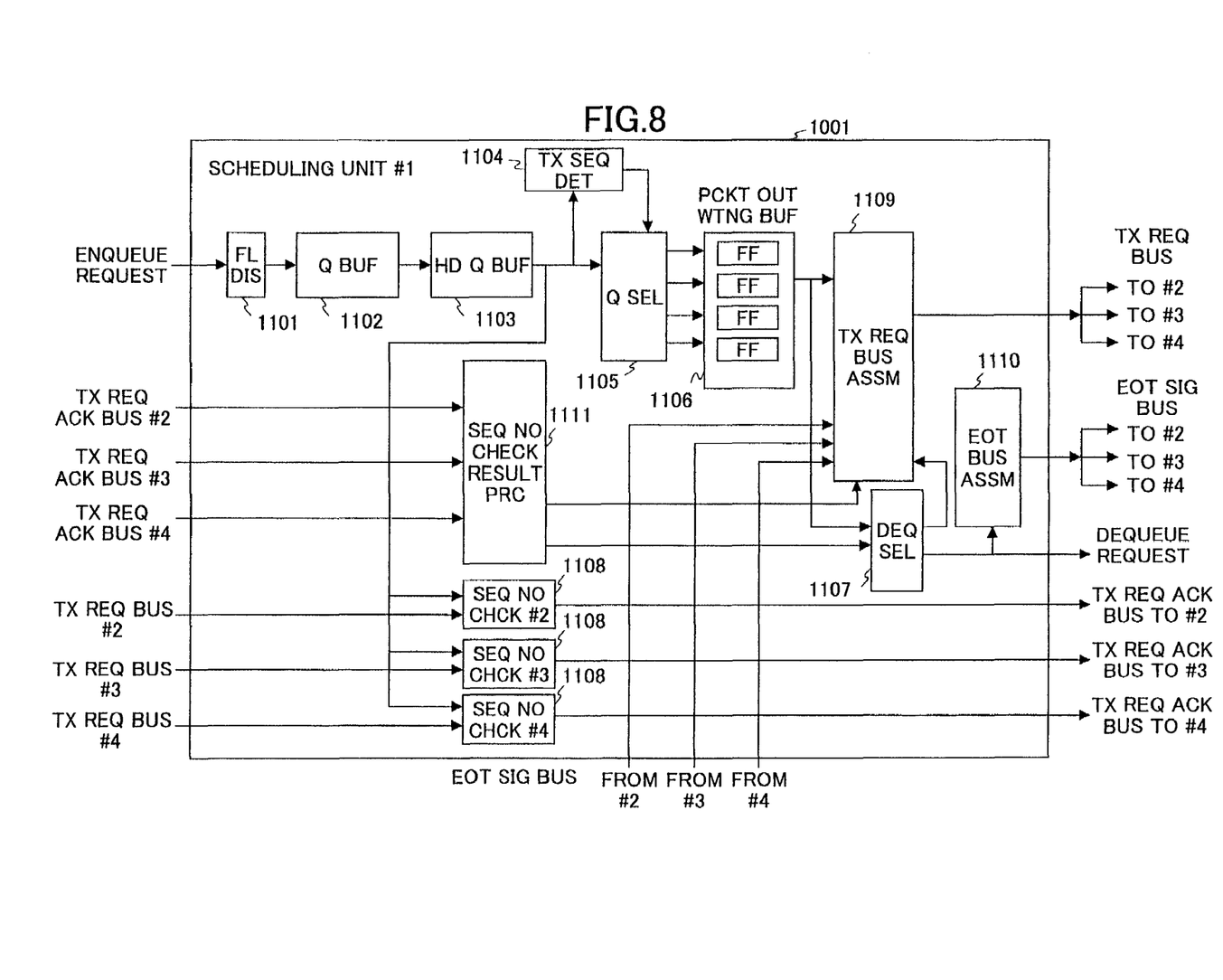
FIG. 8 is a block diagram of another embodiment of the scheduling unit in the router of the present invention.

FIG. 8 shows another embodiment of the scheduling unit in the router of the present invention.

In FIG. 8, the elements that are essentially the same as corresponding elements in FIG. 7 are designated by the same reference numerals, and a description thereof will be omitted.

In the scheduling unit of the present embodiment, the flow distribution unit 1101, the queue buffer 1102, the head queue buffer 1103, the transmitting sequence determination unit 1104, and the queue selection unit 1105 are the same as those corresponding ones in the scheduling unit of the previous embodiment of FIG. 6.

The scheduling unit sends out the dequeue request based on the processing result from each scheduling unit 1001 of the dequeue selection unit 1107 and the sequence number check result processing unit 1111 to the transmitting request bus assembly unit 1109 and the end-of-transmission bus assembly unit 1110. In the end-of-transmission bus assembly unit 1110, the flow number of the packet which performed dequeue to the other scheduling units 1001 based on the signal of the received dequeue request is notified.

The state of the waiting buffer 1106 for a packet output is supervised, and in the transmitting request bus assembly unit 1109, while sending out the dequeue request of the packet which newly became the waiting for dequeue to other scheduling units 1001, the flow number of the completion of transmitting from other scheduling units 1001 is once detected to the packet from which dequeue changed to the waiting state, and when there is the same flow number used as the waiting for dequeue, a transmitting request is sent out again.

When the check results of all the scheduling units that have answered the dequeue request sent from the scheduling unit 1001 are determined as being OK, the flow number of the accepted packet (OK) is notified, and the dequeue signal is sent to the dequeue selection unit 1107 in the sequence number check result processing unit 1111. When the number of the scheduling units of the rejected packet (NG) is one or more, the flow number of the packet serves to perform the transmission waiting until the request of the dequeue waiting is notified to the transmitting request bus assembly unit 1109 and the other scheduling units 1001 sends out the EOT signal.

In the sequence number check unit 1108 of the scheduling units #2 to #4, the transmitting request from other scheduling units 1001 which are performing distributed processing is received. When the sequence number which is held is small as compared with the sequence number of the same flow number which is received, the flow number of the rejected packet (NG) is notified through the transmitting request reply bus 412 (FIG. 7). Otherwise, the flow number of the accepted packet is notified.

As mentioned above, in the present embodiment, by connecting the respective buses with the respective scheduling units 1001 instead of the ring wiring, the time from dispatch of a request to reception of a reply can be shortened, and the shortening of the delay in the router, the error of a scheduling result and the actual packet transmission time can be made small. Therefore, the processing for preventing the packet sequence inversion can be performed at high speed.

Figure 9:
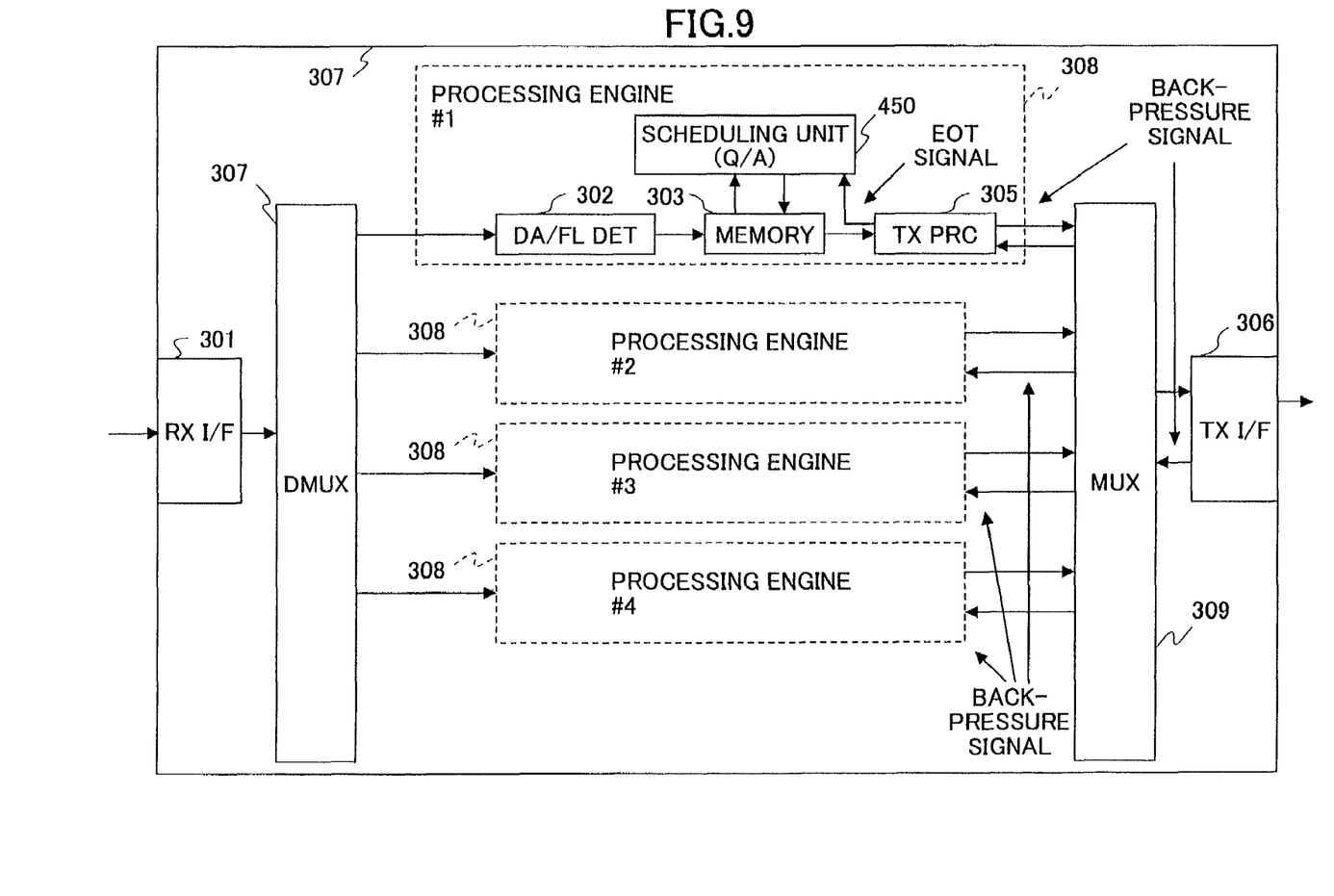
FIG. 9 is a block diagram of another embodiment of the router of the present invention.

FIG. 9 shows another embodiment of the router of the present invention.

In FIG. 9, the elements that are essentially the same as corresponding elements in FIG. 12 are designated by the same reference numerals, and a description thereof will be omitted.

The demultiplexer 307 which adds a sequence number to each packet while the router equipment 300 separates the receiving interface 301 and packet which input a packet. The processing engine 308 controls a packet in response to the output of the core demultiplexer 307. The router includes the transmitting interfaces 306 which transmit outside in response to the output of the multiplexer 309 which performs a frame assembly and waiting in response to the output of these processing engine 308. The memory 303 stores the packet which undergoes the output of the destination-address/flow determination unit 302. The processing engine #1 includes the transmitting processing units 305 which performs the scheduling and the transmitting processing of the frame (or packet). In the present embodiment, the EOT signal to be sent to other scheduling units is transmitted with the dequeue request to the memory 303 from the scheduling unit of concern, when a back pressure signal (which is also called a packet transmitting inhibition signal) is received from the transmission side. The back pressure signal is sent to the scheduling unit of concern when the packet sequence inversion is detected at the time of the actual packet sending out. Therefore, as shown in FIG. 9, when there is a back pressure signal from the side of transmission, the packet sequence inversion is prevented by receiving the EOT signal from the transmitting processing unit 305.

Figure 10:
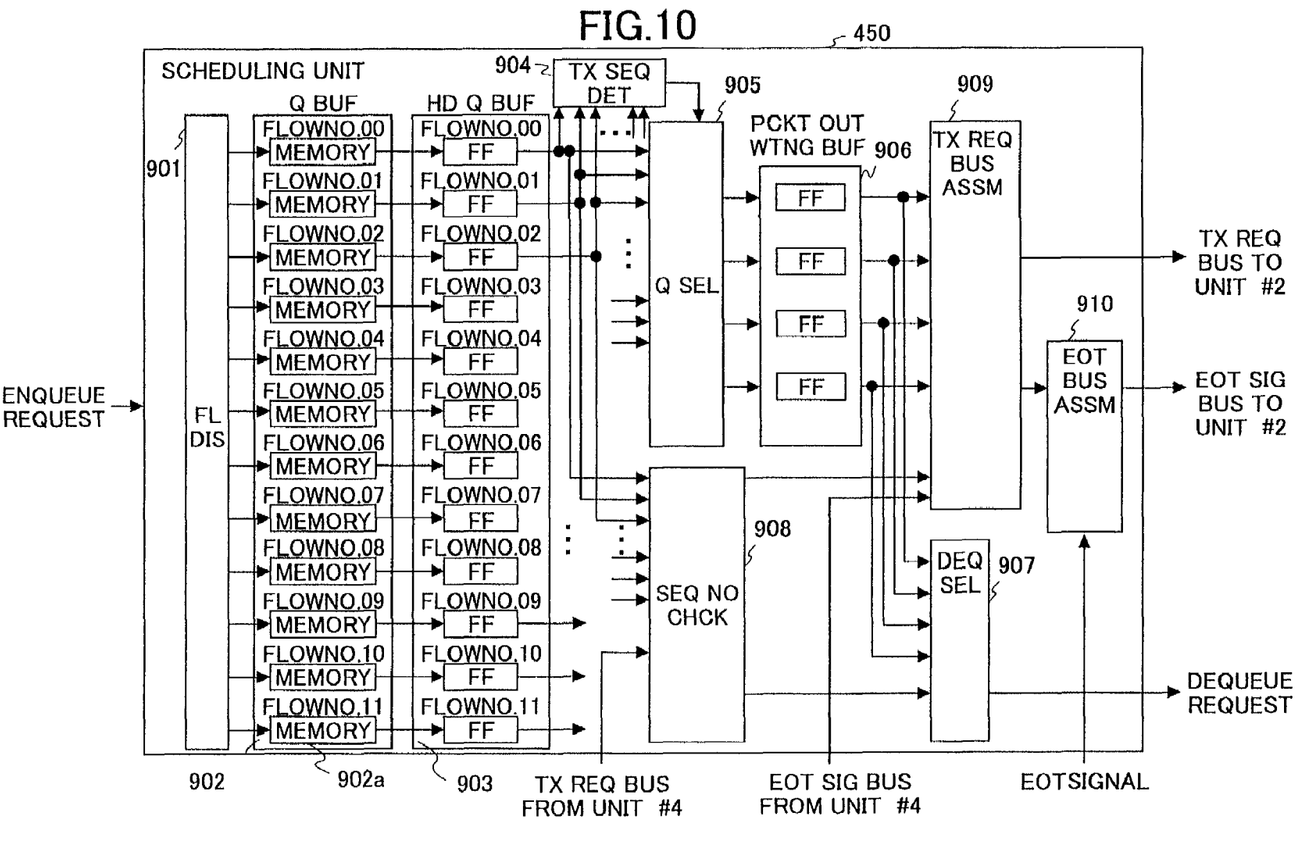
FIG. 10 is a block diagram of another embodiment of the scheduling unit in the router of the present invention.

FIG. 10 shows another embodiment of the scheduling unit in the router of the present invention.

In FIG. 10, the elements that are essentially the same as corresponding elements in FIG. 6 are designated by the same reference numerals, and a description thereof will be omitted.

The end-of-transmission signal on the bus 400B, which notifies that the packets are transmitted to other scheduling units, is generated from the dequeue request in the previous embodiment of FIG. 6. Alternatively, the end-of-transmission signal may be generated as the trigger in the present embodiment. As shown in FIG. 10, the part of the router of the present embodiment where the end-of-transmission signal is generated upon the completion of transmission of the packets, is the transmitting processing unit 305 in the notice bus assembly unit 910, which is different from that of the previous embodiment of FIG. 6.

The present invention is not limited to the above-described embodiments, and variations and modifications may be made without departing from the scope of the present invention.

Further, the present invention is based on Japanese priority application No. 2001-359078, filed on Nov. 26, 2001, the entire contents of which are hereby incorporated by reference.

What is claimed is:

1. A router including a plurality of control units connected in parallel, each control unit having an input connected to a receiving interface and an output connected to a transmitting interface, and performing timing control of outgoing packets to the transmitting interface based on header information of incoming packets from the receiving interface, the incoming packets being stored in a memory and the stored packets being transmitted to the transmitting interface in order of transmission of the outgoing packets based on a result of the timing control, each control unit comprising:

a distributing unit provided in the control unit and distributing transmitting sequence information, related to the stored packets in the memory of the control unit, to other control units, the distributing unit determining whether a packet sequence inversion in the control unit occurs, based on a result of comparison of the transmitting sequence information received from the other control units and the transmitting sequence information held by the control unit, and the distributing unit inhibiting the transmission of the stored packets to the transmitting interface when the packet sequence inversion is detected.

2. The router according to claim 1, wherein the plurality of control units include a plurality of scheduling units which are connected together in a ring configuration, each scheduling unit provided in one of the plurality of control units and distributing a sequence number of each stored packet to other control units.

3. The router according to claim 1, wherein the plurality of control units include a plurality of scheduling units which are connected together in a mesh configuration, each scheduling unit provided in one of the plurality of control units and distributing a sequence number of each stored packet to other control units.

4. The router according to claim 1, wherein each of the plurality of control units determines an output port of the transmitting interface for each of the outgoing packets based on the header information of a corresponding one of the incoming packets from the receiving interface.

5. The router according to claim 1, wherein each of the plurality of control units performs the timing control for each of flow numbers of the incoming packets from the receiving interface, and the distributing unit of each control unit performing the determination of the packet sequence inversion for each of the flow numbers of the incoming packets.

6. The router according to claim 1, wherein the distributing unit provided in each of the plurality of control units performs distributed processing of the determination of the packet sequence inversion for the incoming packets.

7. The router according to claim 1, wherein each of the plurality of control units includes a determination unit which determines a destination address and a flow number of each of the incoming packets based on header information of the packet.

8. The router according to claim 5, wherein the distributing unit sends an output permission signal of the stored packets to the memory of the control unit when it is determined that the packet sequence inversion does not occur, and the distributing unit is set in a waiting state when it is determined that the packet sequence inversion occurs.

* * * * *